(12) United States Patent
Nafarieh

(10) Patent No.: US 8,290,302 B2
(45) Date of Patent: Oct. 16, 2012

(54) METHOD AND SYSTEM FOR SKEW DETECTION OF A SCANNED DOCUMENT USING CONNECTED COMPONENTS ANALYSIS

(75) Inventor: Asghar Nafarieh, Menlo Park, CA (US)

(73) Assignee: Xerox Corporation, Norwalk, CT (US)

( * ) Notice: Subject to any disclaimer, the term of this patent is extended or adjusted under 35 U.S.C. 154(b) by 931 days.

(21) Appl. No.: 12/363,238

(22) Filed: Jan. 30, 2009

(65) Prior Publication Data

US 2010/0195933 A1 Aug. 5, 2010

(51) Int. Cl.
*G06K 9/36* (2006.01)
(52) U.S. Cl. ....... 382/289; 382/274; 382/275; 358/3.26; 358/3.27
(58) Field of Classification Search .............. 382/289, 382/291, 296, 297, 274, 275; 358/3.26, 3.27, 358/463
See application file for complete search history.

(56) References Cited

U.S. PATENT DOCUMENTS

| | | | | |
|---|---|---|---|---|
| 5,640,466 A * | 6/1997 | Huttenlocher et al. | ........ | 382/177 |
| 5,861,939 A * | 1/1999 | Heacock | ........ | 351/218 |
| 5,993,378 A * | 11/1999 | Lemelson | ........ | 600/109 |
| 6,172,769 B1 * | 1/2001 | Rao et al. | ........ | 358/1.9 |
| 6,249,604 B1 * | 6/2001 | Huttenlocher et al. | ........ | 382/174 |
| 6,307,638 B1 * | 10/2001 | Matsumoto | ........ | 358/1.12 |
| 6,912,325 B2 * | 6/2005 | Rombola et al. | ........ | 382/289 |
| 6,959,121 B2 * | 10/2005 | Kumazawa | ........ | 382/294 |
| 7,016,552 B2 * | 3/2006 | Koyama | ........ | 382/289 |
| 7,133,573 B2 * | 11/2006 | Brugger et al. | ........ | 382/289 |
| 7,379,587 B2 | 5/2008 | Curry et al. | | |

* cited by examiner

*Primary Examiner* — Yosef Kassa
(74) *Attorney, Agent, or Firm* — Gibb & Riley, LLC

(57) ABSTRACT

A method and system for skew detection is provided using connected components analysis. The methodology includes extracting connected components corresponding to the image and analyzing the image based on said connected components for determining skew of the image.

21 Claims, 6 Drawing Sheets

METHOD AND SYSTEM FOR SKEW DETECTION OF A SCANNED DOCUMENT USING CONNECTED COMPONENTS ANALYSIS

BACKGROUND

1. Field of Related Art

The present disclosure relates to scanning documents, and more particularly, to a method and system for detecting document skew using connected components analysis.

2. Background of the Related Art

The use of digital input scanners, which can successively scan a set of sheets and record the images thereon as digital data, is becoming common in the office context, such as in digital copiers and electronic archiving. Due to the high frequency in the use of such machines and the large range of mechanical parts involved in the process, there is a high probability that skewing of a document image may result when a document is scanned. The skew may be caused by a number of factors including: careless manual placement of documents within the scanner, how the paper was placed in the hopper or how the transport rollers grab the leading edge of the paper to move it. Also, when documents are transported for scanning using a document feeder, they may become skewed when traveling through the paper path. Thus, there is a need in the art to detect the skew angle of the image content on a scanned page in a fast, accurate, and most efficient manner. Although there is prior art that detects skew of a scanned document, none of the patents in this area use connected components analysis.

There is prior art that detects skew and crop statistics by determining the presence of unwanted extraneous and background information in a scanned document image. The process includes first determining the edge by comparing a scan line of pixels with a predetermined scan line of background pixels or comparing a neighborhood around a scan line with predetermined background pixels. Then, using the slope of the detected edge in the scan image, the skew angle is computed.

There is also prior art that detects skew of a document image by segmenting the input image into regions, each having a predetermined width, and then detecting lines containing black pixels from each of these regions. Using the region where the detected lines contain black pixels and following one another in a consecutive manner, a partial image is extracted. Then, the skew angle of the partial images is calculated and used to determine the skew angle of the entire document image.

Consequentially, prior art systems lack the capability to most effectively and efficiently straighten scanned documents, which is a critical pre-processing step for improving the compression rate, the visualization aspect, the line removal, and the accuracy using Optical Character Recognition ("OCR") during indexing. The present disclosure uses connected components analysis to overcome the drawbacks of prior art methods and systems.

SUMMARY

The present disclosure overcomes drawbacks of prior art skew detection methods and systems by providing for skew detection in high volume scanning operation in the order of 20-30 pages per second, where considerable effort is spent on analysis of other requirements of the documents. Also, the present disclosure discloses that connected components analysis can be used to detect skew in the scanned documents faster than existing methods and systems while utilizing a small memory footprint.

Connected component analysis is an image analysis algorithm utilized to group pixels of a scanned image into components based on pixel connectivity (blob). More specifically, all pixels included within a connected component share substantially similar pixel intensity values (e.g. gray level, color, etc).

The present disclosure provides, in a computer system having at least one processor, a method for detecting skew of an image, such as a scanned document. The method includes extracting connected components corresponding to the image; analyzing the image based on the connected components; identifying blobs based on pixel connectivity and determining boundary points. The method further includes sorting at least one identified group of blobs based on its location on the image; grouping the blobs into data sets based on their location on the image; and determining a skew angle of the image using at least one data set.

The present disclosure also provides a system for skew detection of an image. The system includes at least one computing device having at least one processor; a blob identifying module for identifying connected components using connected components analysis; and a skew detection module for computing skew angle of the image using the identified connected components. Each of the modules has a set of programmable instructions configured for execution by the at least one processor.

The present disclosure also provides a computer-readable medium storing programmable instructions configured for being executed by at least one processor for performing the methods described herein in accordance with the present disclosure. The computer-readable medium can include a flash memory device, CD-ROM, a hard drive, etc.

BRIEF DESCRIPTION OF THE DRAWINGS

Various embodiments of the present disclosure will be described herein below with reference to the figures wherein:

FIGS. 3 and 4 illustrate an example of skew detection in accordance with the present disclosure by showing before and after views, respectively;

DETAILED DESCRIPTION

The present disclosure relates to scanning documents, and more particularly, to a method and system for detecting document skew using connected components analysis, including determining a skew angle. As used herein, the term, "skew" is defined as the angle between the scanning line or recording line and the perpendicular to the paper path. Moreover, the term "skew" may refer to the misalignment of a document or punch card in the feed tray or hopper that prohibits it from being scanned or read properly.

The term "print" is defined as sending a document to the printer through any one of a multitude of ways. Further, the term "printer" can refer to any device that accepts text and graphic output from any type of computing device and transfers the information to any printable medium. A "printer" can refer to any type of xerographic, solid ink, liquid ink, cut sheet or web-based device used to print onto a wide array of printable media. The term "printer" as used herein encompasses any apparatus, such as a digital copier, bookmaking machine, facsimile machine, multi-function machine, etc. which performs a print outputting function for any purpose.

Connected component analysis is an image analysis algorithm utilized to group pixels of a scanned image into components based on pixel connectivity (blob). More specifically, all pixels included within a connected component share substantially similar pixel intensity values (e.g., gray level, color, etc).

The term "scan" means to read a printed form line-by-line in order to convert images into bitmapped representations or convert characters into text. When a text document is scanned into the computer, it is turned into a bitmap, which is a picture of the text. OCR software analyzes the light and dark areas of the bitmap in order to identify each alphabetic letter and numeric digit. When it recognizes a character, it converts it into ASCII text. A "scanner" is a device that captures images from photographic prints, posters, magazine pages, and similar sources for computer editing and display and may be used for scanning black-and-white only, or color.

Embodiments will be described below while referencing the accompanying figures. The accompanying figures are merely examples and are not intended to limit the scope of the present disclosure.

Figure 1:
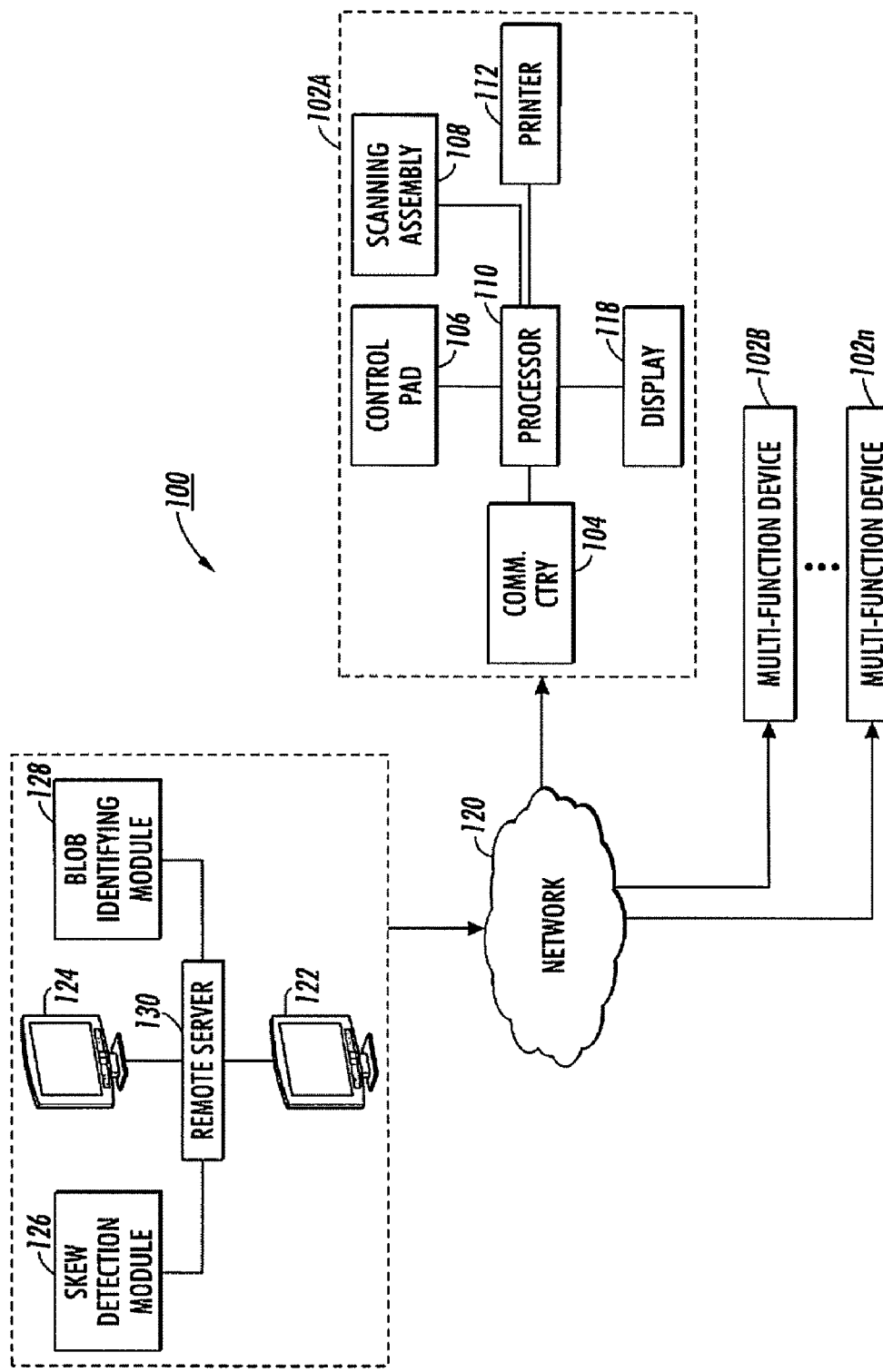
FIG. 1 is a block diagram depicting a skew detection system for skew detection of a scanned document using connected components analysis in accordance with the present disclosure.

With reference to FIG. 1, there is depicted a block diagram of a skew detection system 100 having a plurality of multifunction machines or devices (MFDs) 102A-n. The MFDs are of the type capable of scanning, copying, and electronically transmitting documents. The MFDs can also be xerographic MFDs. A service provider may utilize the system 100 for detecting skew on a particular MFD 102A from a remote server 130. The remote server 130 routes the de-skewed document and information through at least one network 120, such as the Internet, WAN, LAN, etc., to the MFD 102A or MFDs 102A-102n.

The service provider may be an entity or business desiring to perform the connected components analysis on a scanned document image in order to determine the skew angle and correct the skewed document by adjusting the skew angle. It is contemplated that the user of the MFD and the service provider will have a contractual agreement, allowing communications to occur between the service provider and the user of the machine. It is further contemplated that the contractual agreement can provide for the payment of a fee from the owner to the service provider of the computer system 100 for using the system 100 for calculating the skew angle and correcting such skew on at least one MFD 102.

The service provider may be an Independent Service Organization (ISO). An ISO can be entity that develops, offers, controls, manages, owns, alters and/or sells software and/or hardware products. An ISO can be any entity that performs one or more tasks on one or more pre-existing MFDs, which may or may not be controlled or owned by the ISO. For example, the entity can offer a service with an existing software package and/or with any type of existing Internet-based service. In other words, an ISO need not own or provide the MFDs. The MFDs may be owned or provided by any third party not related or associated with the ISO. In the present disclosure, it is contemplated that the entity (such as an ISO) can offer any type of service and/or products. The term "entity" can refer to anything that may exist as a discrete and/or distinct unit that owns, operates, manages, and/or controls one or more of a plurality of machines (such as MFDs). For example, the term "entity" may include the term "company."

The system 100 further includes at least one computer 122, 124, etc. in communication with the remote server 130. Although there is only a single remote server depicted in FIG. 1 it is envisioned that there may be a plurality of remote servers and this should not be taken as a limitation.

The MFD 102A further includes communications circuitry 104; a control pad 106; a scanning assembly 108; at least one processor 110; a printer 112; and a display 118. Upon receipt of user input via one of the control pad 106 and the display 118, the processor 110 receives an instruction for performing a particular function of the MFD 102A.

A function that may be performed under the control of the processor 110 includes controlling the scanning assembly 108 to scan a document. It is contemplated that the user can instruct the processor 110 to instruct the printer 112 or scanning assembly 108 and that the computer system will automatically detect the skew, resulting from the document being scanned and the image being obtained. It is also contemplated that once the blob identifying module 128 and the skew detection module 126 compute the skew angle using connected components (blob) analysis and automatically rotates the document to account for the detected skew angle, the de-skewed document will be transferred back to the MFD.

Alternatively, it is contemplated that the system does not automatically rotate the document to account for the detected skew angle but that the user is given the option of rotating the image based on the skew angle computation or overriding such computation, varying the skew angle based on user preferences, and using the control pad 106 and/or display 118 to rotate the image to a desired position.

Other functions that can be performed under the control of the processor 110 include instructing the printer 112 to print such document after the skew has been corrected. Further, other functions that can be initiated by a user and performed under the control of the processor 110 include: requesting electronic transmission and selecting the appropriate skew angle via a touch-screen icon on the display 118 or other means.

The blob identifying module 128 includes programmable instructions for performing connected components analysis on the scanned documents. The connected components analysis includes extracting connected components of a scanned document and calculating features of the input image based on connected components. The blobs (connected components) are filtered by removing small blobs from the list of blobs. Once the blobs are extracted, various features of the blobs are determined including the "bounding box" or boundary points consisting of the left upper most, right upper most, left bottom most and right bottom most points and "population count" (number of ON pixels) for each blob.

Preferably, the bounding box is defined by the upper left hand corner coordinates (x, y) of the bounding box plus the width and height of the bounding box measured in pixels; this describes where the bounding box is located with respect to the page. For example, a bounding box can be defined as (500, 1000, 10, 20), where 500 is the x-location in pixels relative to left-hand corner of the page, 1000 is the y-location in pixels relative to the top of the page, 10 is the width of the bounding box measured in pixels, and 20 is the height of the bounding box measured in pixels.

The skew detection module 126 further includes programmable instructions for automatic skew detection using connected components analysis. The process can be applied to each blob individually, and then the identified blobs can be sorted based on their location on the document (from left to right and top to bottom). The sorted blobs can be grouped into data sets or lines. Using at least two blobs within a data line the skew angle is computed. It is preferred that at least two blobs are used within a data line to compute the skew angle where the at least two blobs are a minimum distance apart. In one embodiment, the first and last blobs within a data line are used to compute the skew angle. By taking advantage of the blobs being interconnected, the process combines these solutions to determine a skew angle for the entire scanned document image. The skew detection module 126 further includes instructions for displaying the skew angle computation and printing the document after the skew has been adjusted, if the user chooses to do so.

The set of programmable instructions of the blob identifying module 128 and skew detection module 126 can be application software stored within a memory, such as RAM and ROM, of the remote server 130 and/or the MFD 102A, and or a computer-readable medium, such as a hard drive, CD-ROM, flash memory, etc., readable by one or more reading devices of the remote server 130 and/or MFD 102A. Accordingly, although the two modules are depicted separately in FIG. 1 they could be combined as one module or be provided within the at least one processor 110.

The at least one processor 110 of the MFD 102A is in operable communication with the scanning assembly 108, printer 112, the display 118 and the control pad 106. It is also in operable communication with the communication circuitry 104 in order to enable the MFD 102A to receive and transmit messages to and from remote server 130 via network 120, such as the Internet.

Figure 2:
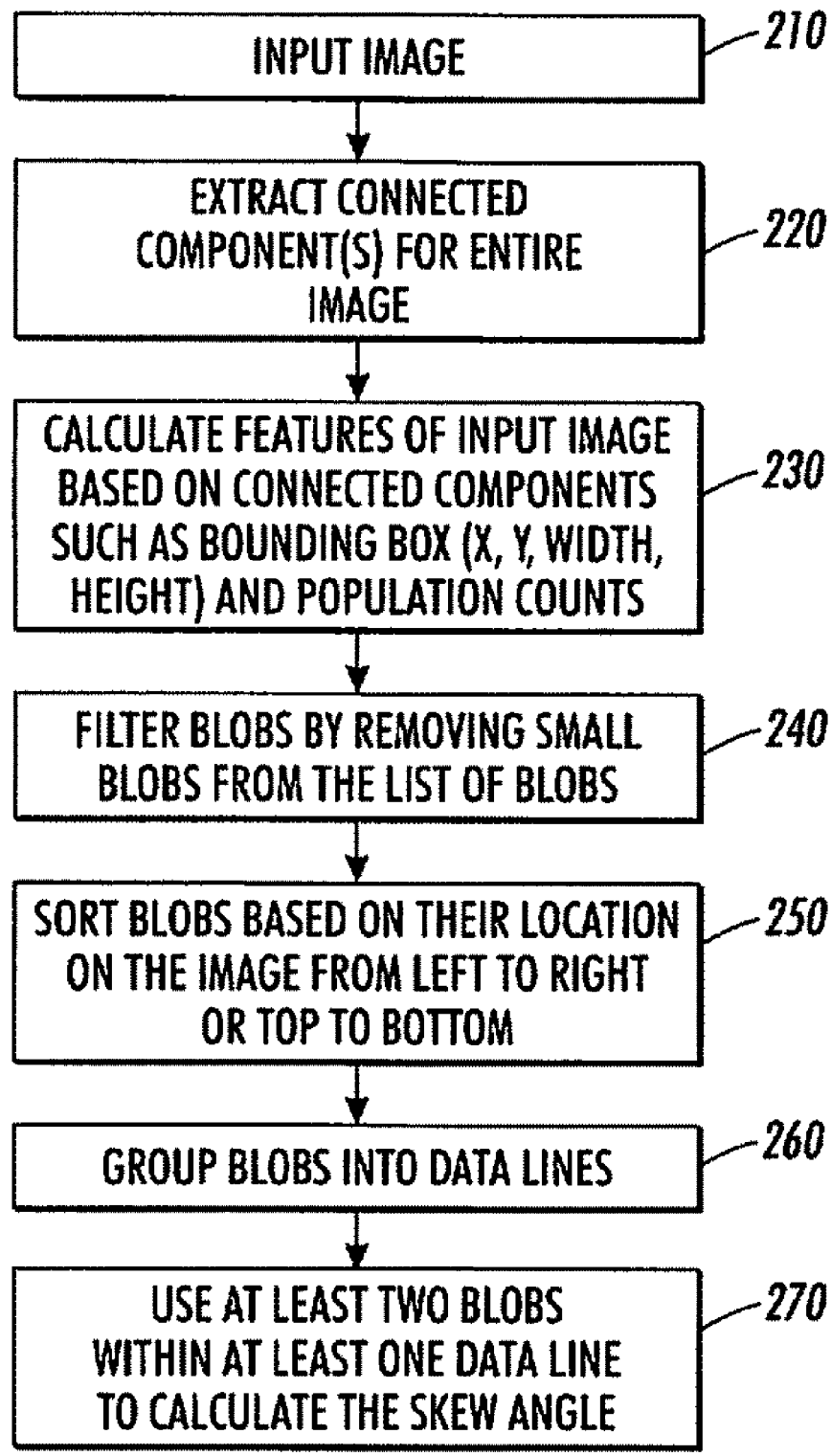
FIG. 2 is a flow chart of a method and system for skew detection using connected components analysis in accordance with the present disclosure.

With reference to FIG. 2, there is illustrated a flow chart of a method for skew detection using connected components analysis in accordance with the present disclosure. In initial step 210, an input image is received by the scanning device and/or printing system. Then, in step 220, the connected components for the entire image are extracted. In step 230, features of the input image are calculated based on the connected components including: bounding box (x, y width, height) and population counts.

Next in step 240, the blobs are filtered by removing small blobs from the list of blobs. The blobs are then sorted based on their location on the image from left to right and top to bottom in step 250. In step 260, the blobs are grouped into lines (or data lines or sets) and using at least two blobs within each data line, such as the first and last blobs within each data line, the skew angle is calculated in step 270.

Figure 6:
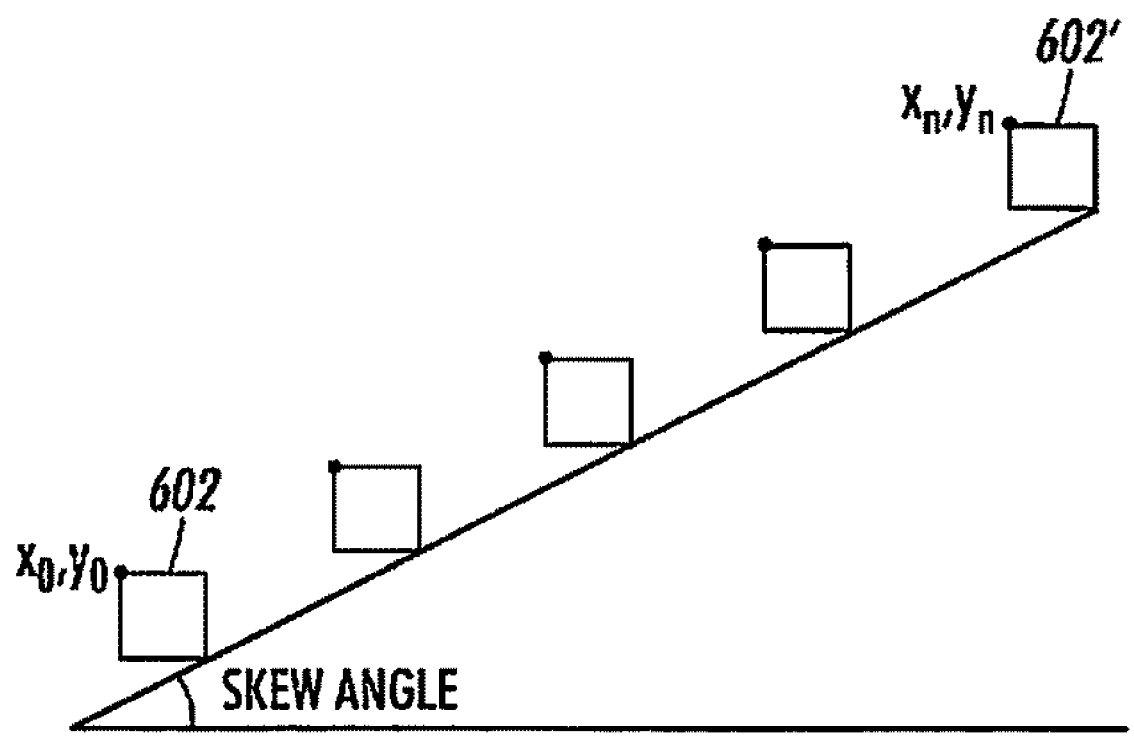
FIG. 6 is an illustration for determining the skew angle in accordance with the present disclosure.

FIG. 6 illustrates an exemplary schematic for determining the skew angle as calculated in step 270 of FIG. 2. As shown by FIG. 6, the skew angle is determined by determining the $x_o, y_o$ coordinates of a bounding box 602 corresponding to a first blob within a data line, and determining the $x_n, y_n$ coordinates of a bounding box 602' corresponding to a last blob within the data line. The skew angle is then determined using the following equation:

$$\text{skew angle} = \arctan[((y_n - y_o)/(x_n - x_o))(180/pi)];$$
$$pi = 3.1415$$

Even though it is shown in FIG. 6 that the first and last blobs within the data line are used to compute the skew angle, as discussed above, any two blobs within a data line can be used to compute the skew angle. The two blobs are preferably a minimum distance apart.

Figure 3:
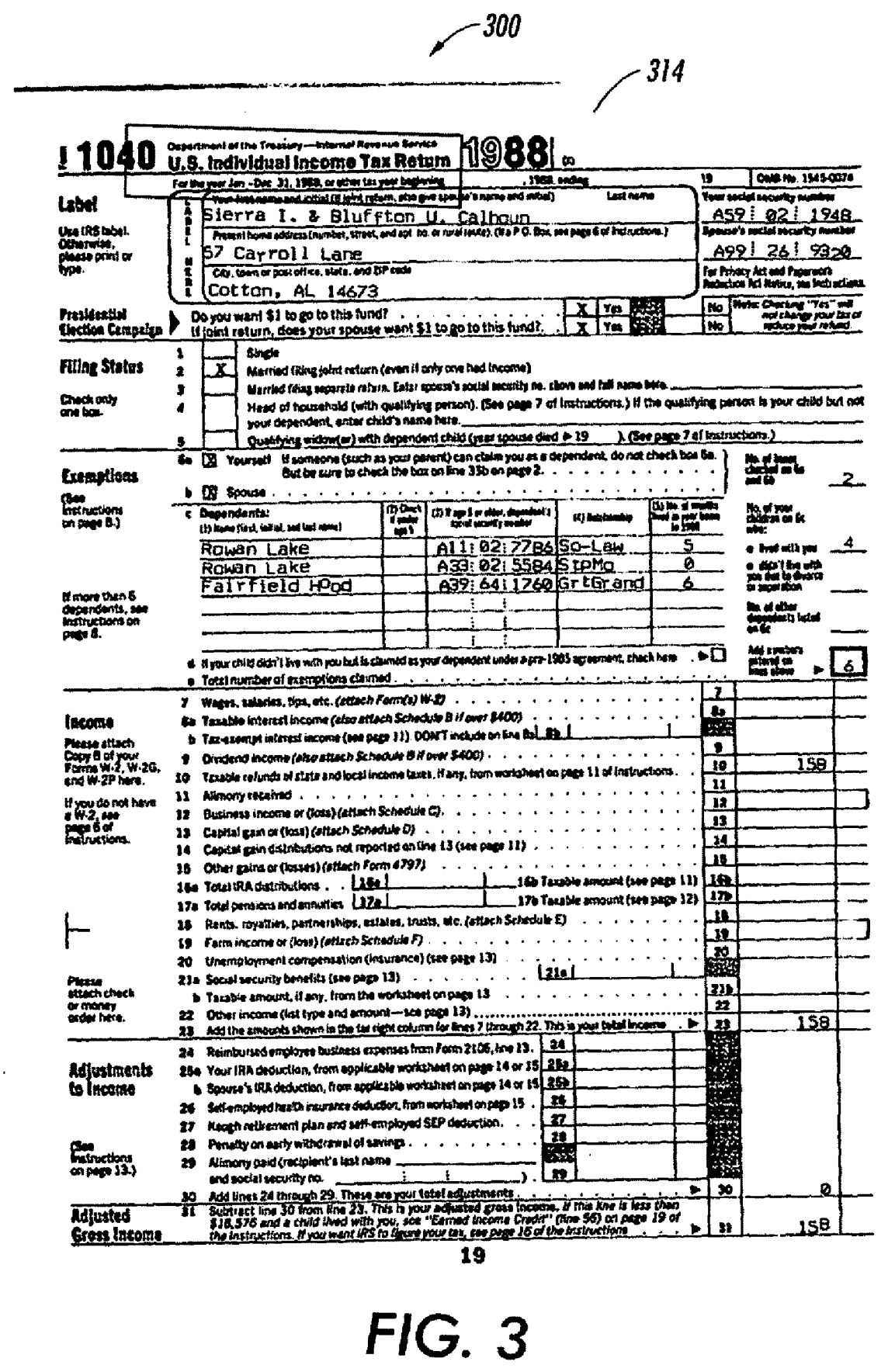
Figure 4:
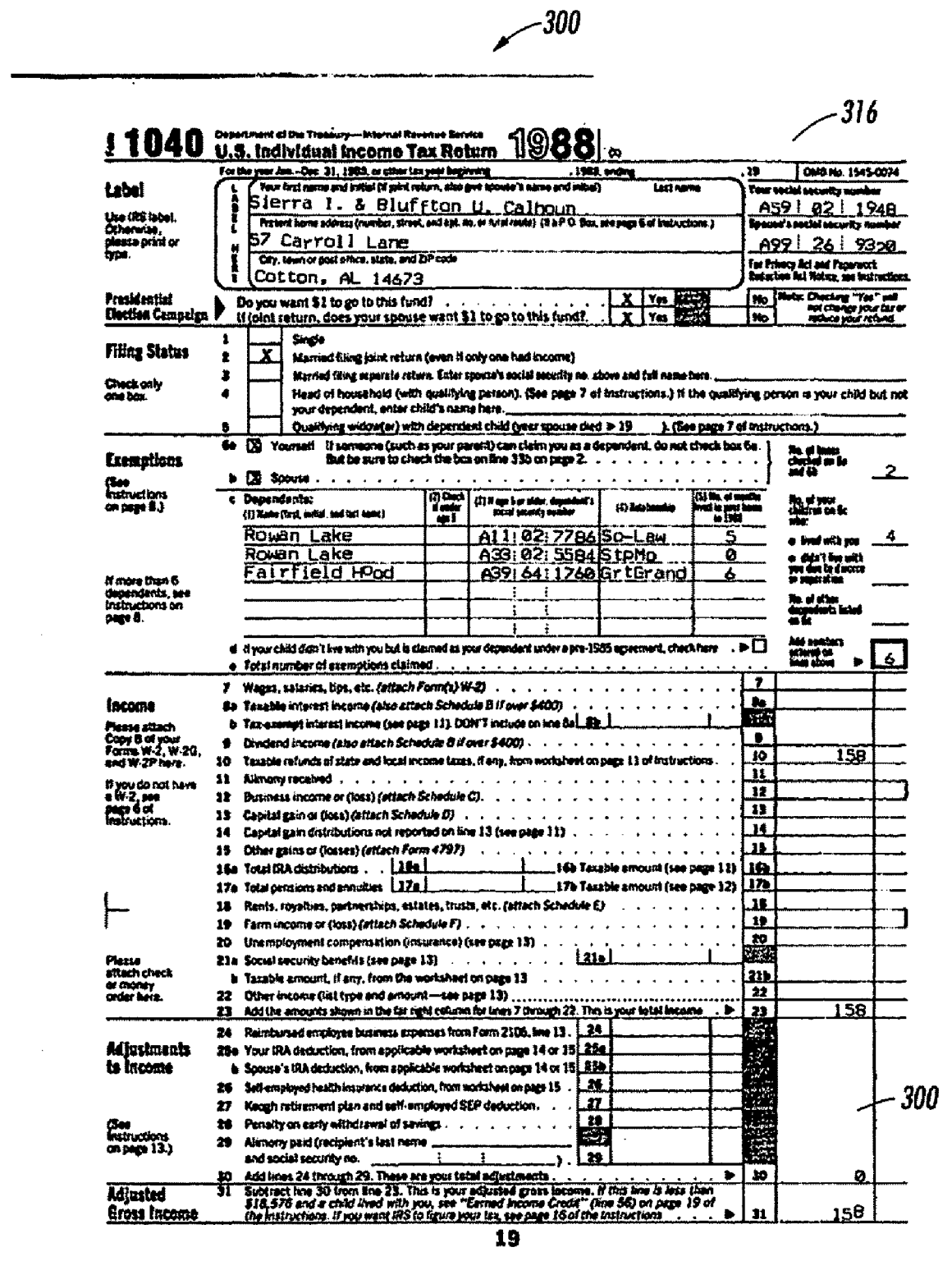

FIGS. 3 and 4 show images 300 to illustrate the operation of the skew detection algorithm using connected components analysis according to present disclosure. More specifically, FIGS. 3 and 4 illustrate the input image before and after connected components analysis has been performed as depicted by reference numerals 314 and 316, respectively.

Figure 5:
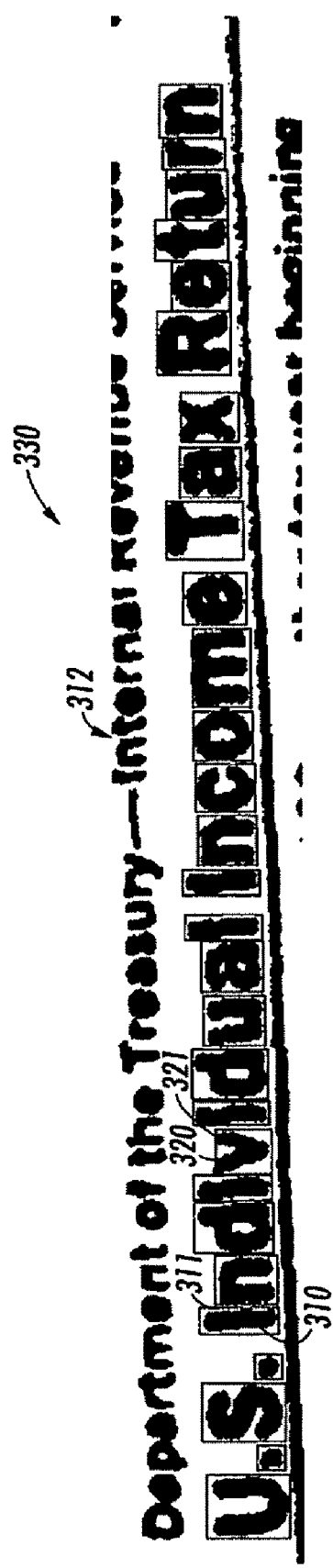
FIG. 5 is a cropped image showing the result of running a skew detection algorithm in accordance with the present disclosure on a small area of the image.

With continued reference to FIGS. 3 and 4, connected component analysis (e.g., blob extraction) is used to calculate features of an input image received through, for example, a digital input scanner as part of a digital copier or an MFD. An input image is analyzed individually, the blobs are extracted, sorted, and grouped into lines and skew angle is calculated. Once the blobs are identified, the bounding box is determined, as seen in FIG. 5, blobs 310 and 320 are depicted with a bounding box 311 or 321, representing the extent along the axes of the left-most, right-most, top-most, and bottom-most points of the blobs.

After the blobs have been sorted into lines, any noise is removed by filtering the "noise blobs." Also, at least two blobs in each data line are used to compute the skew angle. This process could be repeated for several data lines to ensure consistency in the detected skew angle.

In accordance with an embodiment of the present disclosure, it is envisioned that a user of the system pays a fee to the service provider (e.g., a leaser of the MFD) for the latter, either directly via the system or a server in operative communication with the system, providing document skew detection and correction to documents scanned by the user. The fee can offset the operator's or service provider's expenses in operating the system and also provide a profit to the service provider.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. In a computer system, a method for detecting skew of an image using connected components analysis performed by at least one processor, the method comprising:
    identifying groups of pixels in said image as blobs based on pixel connectivity;
    determining boundary points of said blobs;
    sorting said blobs based on their location on said image;
    grouping said blobs into data lines having at least two blobs in each data line; and
    using said boundary points of said blobs, determining a skew angle of said image in at least one data line, comprising:
        identifying coordinates of said boundary points for a first blob in said at least one data line;
        identifying coordinates of said boundary points for a second blob in said at least one data line;
        determining a line formed by said boundary points for said first blob and said boundary points for said second blob using said coordinates; and
        calculating an angle between said line formed by said boundary points and a line perpendicular to said image.

2. The method according to claim 1, further comprising varying said skew angle of said image based upon user preferences.

3. The method according to claim 1, further comprising scanning a document to obtain said image.

4. The method according to claim 1, further comprising rotating said image to a desired position based on said determined skew angle.

5. The method according to claim 1, further comprising determining a population count for each of said blobs.

6. The method according to claim 1, said boundary points consisting of (x, y, width, height), said x, y being coordinates of an upper left-hand corner of a bounding box surrounding said blob.

7. The method according to claim 1, each of said plurality of data lines consisting of blobs of said image.

8. The method according to claim 1, further comprising scanning a plurality of images and determining one of said plurality of images to be a reference image.

9. The method according to claim 1, said step of sorting said blobs being based on blob locations from left to right and top to bottom.

10. The method according to claim 1, a first image signal representing a first blob of said image being identified as falling within a first bounding box, and a second image signal representing a second blob of said image being identified as falling within a second bounding box.

11. A system for skew detection of an image comprising:
at least one computing device having at least one processor;
a blob identifying module that identifies connected components within said image using connected components analysis, said connected components comprising a group of pixels having substantially similar pixel intensity values; and
a skew detection module that computes a skew angle of said image using said identified connected components, comprising:
identifying coordinates of boundary points for a first blob identified by said blob identifying module;
identifying coordinates of boundary points for a second blob identified by said blob identifying module;
determining a line formed by said boundary points for said first blob and said boundary points for said second blob using said coordinates; and
calculating an angle between said line formed by said boundary points and a line perpendicular to said image,
each of said modules having a set of programmable instructions configured for execution by said at least one processor.

12. The system according to claim 11, said at least one computing device comprising a server in operative communication with a plurality of devices, each having a scanning assembly for scanning documents.

13. The system according to claim 11, further comprising means for rotating said image based on said computed skew angle.

14. The system according to claim 11, said blob identifying module comprising means for extracting one or more connected components of said image.

15. The system according to claim 11, said skew detection module comprising means for computing said skew angle of said image by using coordinates of at least one group of blobs.

16. A non-transitory computer-readable storage medium readable by a computerized device, said non-transitory computer readable storage medium storing programmable instructions configured for execution by at least one processor of said computerized device for performing a method comprising:
identifying groups of pixels in an image as blobs based on pixel connectivity;
determining boundary points of said blobs;
sorting said blobs based on their location on said image;
grouping said blobs into data lines having at least two blobs in each data line; and
using said boundary points of said blobs, determining a skew angle of said image in at least one data line, comprising:
identifying coordinates of said boundary points for a first blob in said at least one data line;
identifying coordinates of said boundary points for a second blob in said at least one data line;
determining a line formed by said boundary points for said first blob and said boundary points for said second blob using said coordinates; and
calculating an angle between said line formed by said boundary points and a line perpendicular to said image.

17. The non-transitory computer-readable storage medium according to claim 16, further comprising rotating said image to a desired position based on said determined skew angle.

18. The non-transitory computer-readable storage medium according to claim 16, said step of sorting said blobs being based on blob locations from left to right and top to bottom.

19. The non-transitory computer-readable storage medium according to claim 16, a first image signal representing a first blob of said image being identified as falling within a first bounding box, and a second image signal representing a second blob of said image being identified as falling within a second bounding box.

20. A method for skew detection of an image comprising:
identifying connected components within said image using connected components analysis; and
computing skew angle of said image using said identified connected components, comprising:
identifying coordinates of boundary points for a first blob identified by using connected components analysis;
identifying coordinates of boundary points for a second blob identified by using connected components analysis;
determining a line formed by said boundary points for said first blob and said boundary points for said second blob using said coordinates; and
calculating an angle between said line formed by said boundary points and a line perpendicular to said image.

21. The method according to claim 20, further comprising rotating said image based on said computed skew angle.

* * * * *